United States Patent [19]
Vallve

[11] Patent Number: 5,586,529
[45] Date of Patent: Dec. 24, 1996

[54] PNEUMATIC ENGINE VALVE SPRING ASSEMBLY

[76] Inventor: Serge Vallve, 33320 Hereford Way, Lake Elsinore, Calif. 92530

[21] Appl. No.: 527,441

[22] Filed: Sep. 13, 1995

[51] Int. Cl.⁶ .................................. F01L 3/10; F16F 1/00
[52] U.S. Cl. ............................... 123/90.65; 123/188.17; 251/337
[58] Field of Search ............................ 123/90.14, 90.65, 123/90.66, 90.67, 188.13, 188.17; 251/337

[56] References Cited

U.S. PATENT DOCUMENTS

| | | | |
|---|---|---|---|
| 2,342,003 | 2/1944 | Meyer | 123/92 |
| 3,120,221 | 2/1964 | Lyons | 123/90 |
| 3,722,483 | 3/1973 | Overby | 123/90.14 |
| 4,484,545 | 11/1984 | Madsen | 123/90.12 |
| 4,592,313 | 6/1986 | Speckhart | 123/90.14 |
| 5,058,538 | 10/1991 | Erickson et al. | 123/90.65 |
| 5,058,541 | 10/1991 | Shibata et al. | 123/90.37 |
| 5,190,262 | 3/1993 | Woollatt | 251/48 |
| 5,203,535 | 4/1993 | Richeson et al. | 251/48 |
| 5,224,683 | 7/1993 | Richeson | 251/30.01 |
| 5,233,950 | 8/1993 | Umemoto et al. | 123/90.14 |
| 5,287,829 | 2/1994 | Rose | 123/90.12 |
| 5,339,777 | 8/1994 | Cannon | 123/90.12 |

Primary Examiner—Weilun Lo

[57] ABSTRACT

Pneumatic valve spring members (10) provide replacement for mechanical springs used to seat engine valves in internal-combustion engines. A valve guide (16) sits atop the engine head 40, allowing the valve stem (12) of valve (14) to pass and reciprocate therethrough. At the distal end of the valve stem (12), a valve retainer (30) is attached to the valve stem (12). The valve retainer (30) is spaced apart from the valve guide (16). A bellows seal flexibly interconnects the valve retainer (30) with the valve guide (16). Upper and lower isolators (52), (50) serve to hold an air cushion about the valve stem (12) adjacent the bellow seal (42). The air cushion (60) serves to maintain and store pressure, lifting the distal end of the valve stem (12) toward the rocker arm (36).

8 Claims, 4 Drawing Sheets

PNEUMATIC ENGINE VALVE SPRING ASSEMBLY

TECHNICAL FIELD

The present invention relates to biasing means replacing valve springs in an internal-combustion engine and, more particularly, to pneumatic or gas biasing means used to urge an engine valve to its closed position.

BACKGROUND ART

In internal-combustion engines, whether diesel or gasoline powered, engine valves serve to ventilate the combustion chamber. Intake valves allow the flow of pre-mixed air and fuel into the combustion chamber. Exhaust valves allow the exit of the combustion products. Between the intake and exhaust of the air-fuel mixture and combustion products, the valves seal the combustion chamber so that the resulting explosion may drive the piston to turn the crankshaft. Operation of such valves is known in the art and generally well within the knowledge of the average professional automobile mechanic.

In order the seat the valve against the side of the combustion chamber or cylinder, valve springs are used that bias the valve against the cylinder side. Such springs generally take an average of 80 to 140 pounds pressure per square inch (psi, $5.5 E^5$ to $9.6 E^5$ Pascal (Pa)) per valve spring in order to initially unseat the valve and open the cylinder to gas flow. At full compression, the pressure increases to 300 to 600 psi ($2.0 E^6$ to $4.1 E^6$ Pa) per valve spring. This increased pressure is due to the well-known quality of springs to increase their opposing force with displacement.

Such pressure comes only from one source, namely, the running engine itself. As the engine must provide the energy to open and close its own valves, such energy cannot be used to propel the vehicle, diminishing fuel economy and engine performance. It is more efficient and advantageous to have a valve biasing means which exerts a constant, not increasing, restoring force. Under such circumstances, the load upon the engine would be diminished and quicker and easier opening and closing of the valves would occur.

As opposed to liquid, hydraulic, engine valves, the use of a gas provides additional advantages not realized through liquid hydraulics. As is well-known, liquids are basically incompressible. Gases, on the other hand, are very compressible and can provide means by which a restoring force can be provided for engine valves in an internal combustion engine. The compressible nature of gases allows them to locally absorb forces that would otherwise be distributed and transmitted, creating some greater inertia with respect to the liquid hydraulic system as a whole. As gases can be locally compressed when subject to rapidly applied pressure, such distribution of the energy does not have to be immediately transmitted. This provides some inherent resiliency and certain advantages not realized by a liquid hydraulic valve system.

The device, as set forth herein, exploits these advantages to provide significant improvements upon engine performance.

Some attempts have previously been made along these lines.

| U.S. Pat. No. | Inventor | Issue Date |
| --- | --- | --- |
| 2,342,003 | F. C. Meyer | February 15, 1944 |
| 3,120,221 | J. Lyons | February 4, 1964 |
| 3,722,483 | H. Overby | March 27, 1973 |
| 4,484,545 | J. G. Madsen | November 27, 1984 |
| 4,592,313 | F. H. Speckhart | June 3, 1986 |
| 5,058,541 | M. Shibata, et al. | October 22, 1991 |
| 5,190,262 | D. Woollatt | March 2, 1993 |
| 5,203,535 | W. E. Richeson, et al. | April 20, 1993 |
| 5,224,683 | W. E. Richeson | July 6, 1993 |
| 5,233,950 | A. Umemoto, et al. | August 10, 1993 |
| 5,287,829 | N. E. Rose | February 22, 1994 |
| 5,339,777 | H. N. Cannon | August 23, 1994 |

Some of the more pertinent patents shown above are described briefly below.

M. Shibata, et al., U.S. Pat. No. 5,058,541

This patent is directed to a valve operating system of an internal-combustion engine which includes provision for air pressure biasing the valve in a valve closing direction. Referring to FIG. 1, the assembly includes cam 8 mounted on cam shaft 7 for operation of valve 5. Numeral 8a denotes a circular base portion corresponding to a valve-closing timing of valve 5 while lobe portion 8b corresponds to a valve-opening timing of valve 5. The opening and closing of valve 5 is seen by noting valve opening 3. Piston 16 is fixed to valve shaft portion 5a and operates within sliding bore 10a in place of the usual valve spring closing mechanism. Air supply source 25 operates through check valve 23 and line 24 to pressurize chamber 13, thus biasing valve 5 in a closing direction.

F. H. Speckhart, U.S. Pat. No. 4,592,313

This reference describes a pneumatic valve return for an internal-combustion engine. The pneumatic valve return device is designed to replace mechanical springs in a cam operated valve mechanism. FIG. 1 shows a valve 14 for operation within cylinder head 10 of an internal-combustion engine. Valve 14 may be either an intake or an exhaust valve for closing a port 17 in a combustion chamber 19. Valve stem 18 is supported for reciprocating within valve guide 24 and extends through cylinder head 10 between port 17 and actuating mechanism 22. The pneumatic valve return mechanism is denoted with numeral 12 and comprises a valve return cylinder 32 with bore 34 positioned on cylinder head 10 above valve 14. Valve return cylinder 32 would be approximately the same dimensions as a conventional valve spring. Piston 76 is fitted for sliding motion within cylinder bore 34 which is pressurized through conduit 98 for biasing the valve into a closed position when required.

A. Umemoto, et al., U.S. Pat. No. 5,233,950

This patent is directed to a valve operating system for an internal-combustion multicylinder engine wherein the intake and exhaust valves are biased in their closed directions by air pressure instead of the usual valve springs. This reference is particularly interested in the pressure control valve and common relief passage and not the actual biasing of the engine valve in a closed direction as found in the previous two references discussed.

J. G. Madsen, U.S. Pat. No. 4,484,545

This reference is directed to a hydraulically actuated exhaust valve of an internal-combustion engine. The valve is biased for opening by the gas pressure found within the combustion chamber and is kept closed by an opposed hydraulic pressure. The device uses hydraulic fluid rather than the air as described in the previous patents discussed. The opening and closing movements of the exhaust valve is accomplished by means of the valve and duct arrangement shown in FIG. 2 wherein reference numeral 19 indicates the high-pressure section which operates to bias the valve in a closing direction. This high-pressure system is connected to working chamber 18 (as seen in FIG. 1) which is designated the "closing chamber" and which substitutes for the normal spring closing device found in conventional design valve systems.

W. E. Richeson, et al., U.S. Pat. No. 5,203,535

This patent is directed to a cam actuated valve assembly that includes a hydraulic spring device which provides the force to return the valve to the closed position. This system takes the place of the normal coil springs what are used in conventional valve assemblies.

J. Lyons, U.S. Pat. No. 3,120,221

This patent provides another example of a pneumatic valve return system in an internal-combustion engine. Referring to FIG. 2, valve 24 is connected to valve cylinder 28 which is pressurized through inlet 54 from supply pipe 58 in order to bias valve 24 in a closing direction.

None of these previously mentioned attempts at achieving pneumatic engine valves advantageously provide the same features as those which are set forth herein. Additionally, the present system provides means by which present internal-combustion engines may be retrofitted in order to accommodate pneumatic spring valves. Despite the ease with which retrofitting is accomplished, the present invention operates in an efficient and reliable manner in order to provide engine valves that place a diminished load upon the engine while enhancing engine performance.

DISCLOSURE OF INVENTION

The present invention resides in providing pneumatic means by which engine valves may be urged to their closed position, yet such biasing is easily overcome by the temporary force of the rocker arm.

The engine valve passes through the engine head per normal valve operation so that the engine valve may reciprocate, opening and closing to allow the flow of gases into and out of the combustion chamber. External to the combustion chamber atop the engine head, a valve guide is situated that may be attached or seated within a well present in the engine head. The valve guide positions and supports the valve stem and allows the valve stem to reciprocate therethrough while providing a seal against blow-by flow of gases from the combustion chamber. The valve retainer is positioned at the distal end of the valve stem close to its engaging point with the rocker attn. The valve retainer serves as means by which other structures present in the pneumatic valve may be positioned and secured.

Intermediating the valve guide and the valve retainer is a flexible bellows seal. One side of the bellows seal is connected to the valve guide while the other is connected to the valve retainer. The manifold segment of the bellows seal serves to allow articulating flexibility of the bellows seal with respect to the reciprocating valve and the reciprocating motion of the valve retainer with respect to the valve guide. The bellows seal also serves to seal in the blow-by gases that may travel around the valve stem through the valve guide and engine head into the valve cover. The bellows seal serves to prevent these gases from traveling into the pneumatic valve member of the present invention, protecting it from any destructive gases and the heat carried by such combustion products.

Fitted about the valve stem and between the valve retainer and the valve guide is a piston bumper that serves to prevent any direct contact between the valve retainer and the valve guide. The piston bumper serves to prevent any damage should the pneumatic portions of the pneumatic valve members provide insufficient resistance against the force of the rocker arm. Extending laterally outward from both the valve retainer and valve guide are isolators preferably made of porcelain, ceramic, or other strong insulating material. The isolators serve to hold in place the air cushion which is the active pneumatic portion of the pneumatic valve spring. The isolators transmit the rocker arm pressure to the air cushion and serve to isolate the air cushion from the surrounding heat present within the operating environment of the engine.

The air cushion of the present invention surrounds the bellows seal and may take several forms with dual-bladder, generally oval or rectangular, or tapered conical configurations being among three currently contemplated. The different embodiments have different performance characteristics with the response of the dual-bladder configuration being the quickest and the tapered conical being the least responsive. The ability to tailor the response characteristics of the pneumatic valve spring members of the present invention is but one of the several advantages realized when the present invention is put to use.

MODE(S) FOR CARRYING OUT THE INVENTION

The present invention allows pneumatic valve spring members to be substituted for previous mechanical valve springs. As a result, greater engine performance is obtained without requiring dramatic engine changes.

Figure 1:
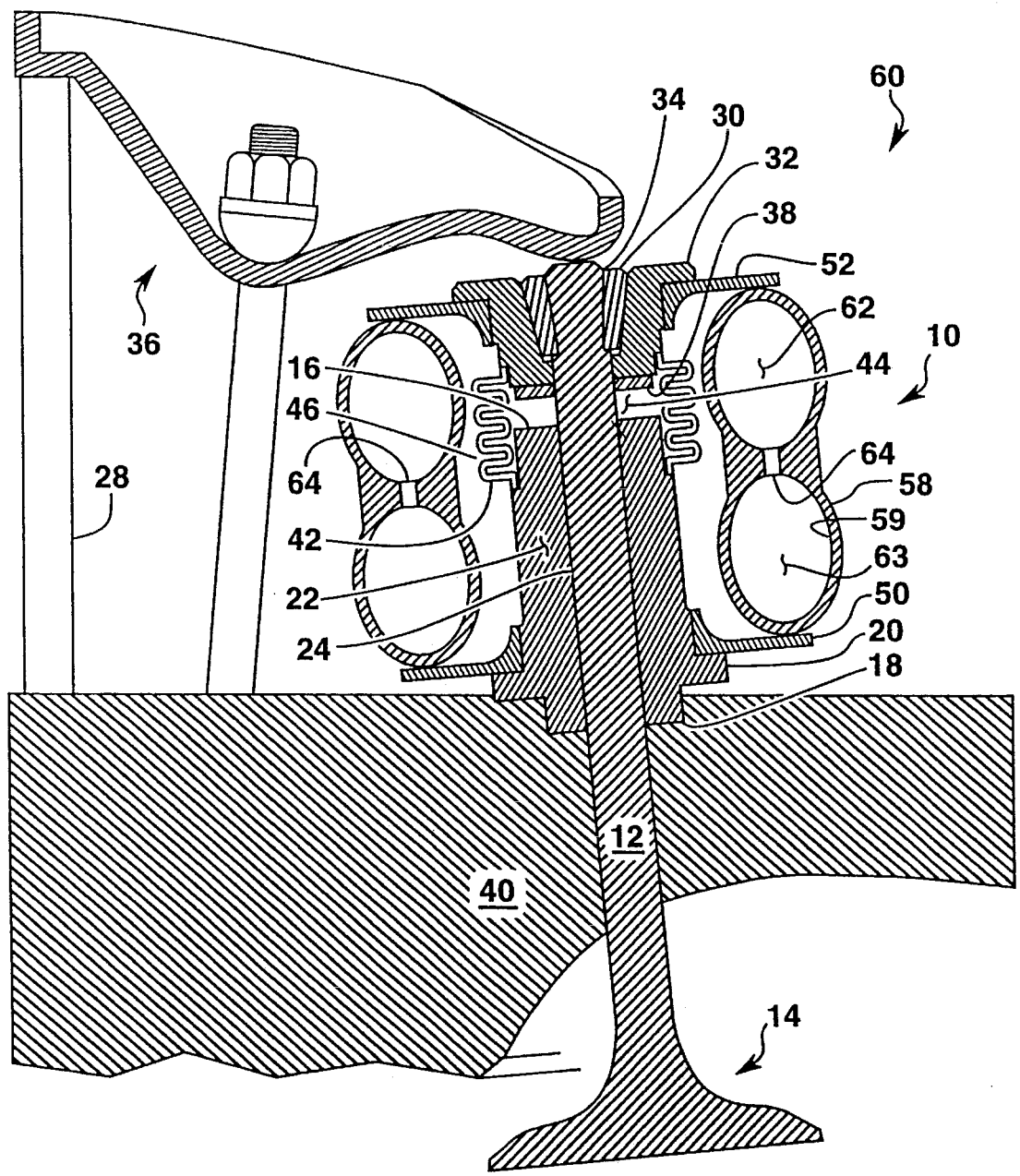
FIG. 1 shows in cross section a first embodiment of the pneumatic spring valve member of the present invention.

As shown in FIG. 1, the pneumatic valve spring member 10 encircles the valve stem 12 of an engine valve 14. The valve stem travels through the engine head 40 with the valve protruding into the combustion chamber when in the open position. The valve stem 12 travels through the engine head 40 until in close proximity to the rocker arm 36. As the valve stem 12 travels outside the engine head, it passes through the valve guide 16. Valve guide 16 is attached to or floats upon in frictional attachment to the engine head 40. The valve guide 16 may have a protruding portion 18 that sits within a well formed into the engine head 40. A flange 20 may protrude laterally from the valve guide 16 in order to provide greater stability for the valve guide 16 and the pneumatic valve spring member 10 as a whole.

Extending away from the engine head 40, the valve guide 16 has a cylindrically annular projecting portion 22 that provides guidance and support for the valve stem 12 reciprocating therethrough. Central to the protruding portion 18, flange 20, and the cylindrically annular projection 22 is the valve stem passage 24 through which the valve stem 12 passes.

Attached to the distal end of the valve stem 12 near its engaging point with the rocker arm 36 is the valve retainer 30. The valve retainer 30 fits about the distal end of the valve stem 12 and has a flange 32 that may be flush with the top of the valve stem 12. The valve retainer 30 is attached to and travels with the valve 14 and is spaced apart from the valve guide 16. The valve retainer 30 has a central aperture 34 through which the distal end of the valve stem 12 passes and at which the valve retainer 30 is attached to the valve stem 12.

Fitting about the valve stem 12 between the valve retainer 30 and the valve guide 16 is a piston bumper 38 made of flexible and/or resilient material. The piston bumper 38 serves to prevent any rough forceful contact between the valve retainer 30 and the valve guide 16 so as to preserve these two elements in good condition. As with many of the elements in the present invention, the piston bumper 38 encircles and surround the adjacent valve stein area.

Also intermediating the valve retainer 30 and the valve guide 16 is a bellows seal 42. The bellows seal 42 encircles and surrounds the piston bumper 38 and the gap 44 between the valve retainer 30 and the valve guide 16. The bellows seal 42 flexibly articulates with the reciprocating motion of the valve retainer 30 with respect to the valve guide 16. The manifolds 46 of the bellows seal resiliently flex in order to provide resilient sealing means. The bellows seal 42 prevents gases produced in the combustion chamber from flowing through the passageway 24 through which the valve stem 12 reciprocates. These blow-by gases are not only hot but can also be destructive due to the chemically reactive nature of such gases. By using an inert bellows seal 42, such gases are contained and do not pass through valve stem passageway 48 into the pneumatic valve spring member 10 or into the valve cover.

Extending laterally outward from above the valve guide flange 20 is a lower isolator 50. Corresponding to and facing the lower isolator 50 is the upper isolator 52. The upper isolator 52 is generally fixed immediately below the valve retainer flange 32. Both the upper 52 and lower 50 isolators are made of porcelain/ceramic or other inert insulating material. Use of insulating material for the isolators 50, 52 serves to protect the air cushion 60 held between the two isolators 50, 52. By protecting the air cushion 60 from heat, the air cushion 60 enjoys a longer useful life and is not subject to great variations in thermal stresses.

Figure 2:
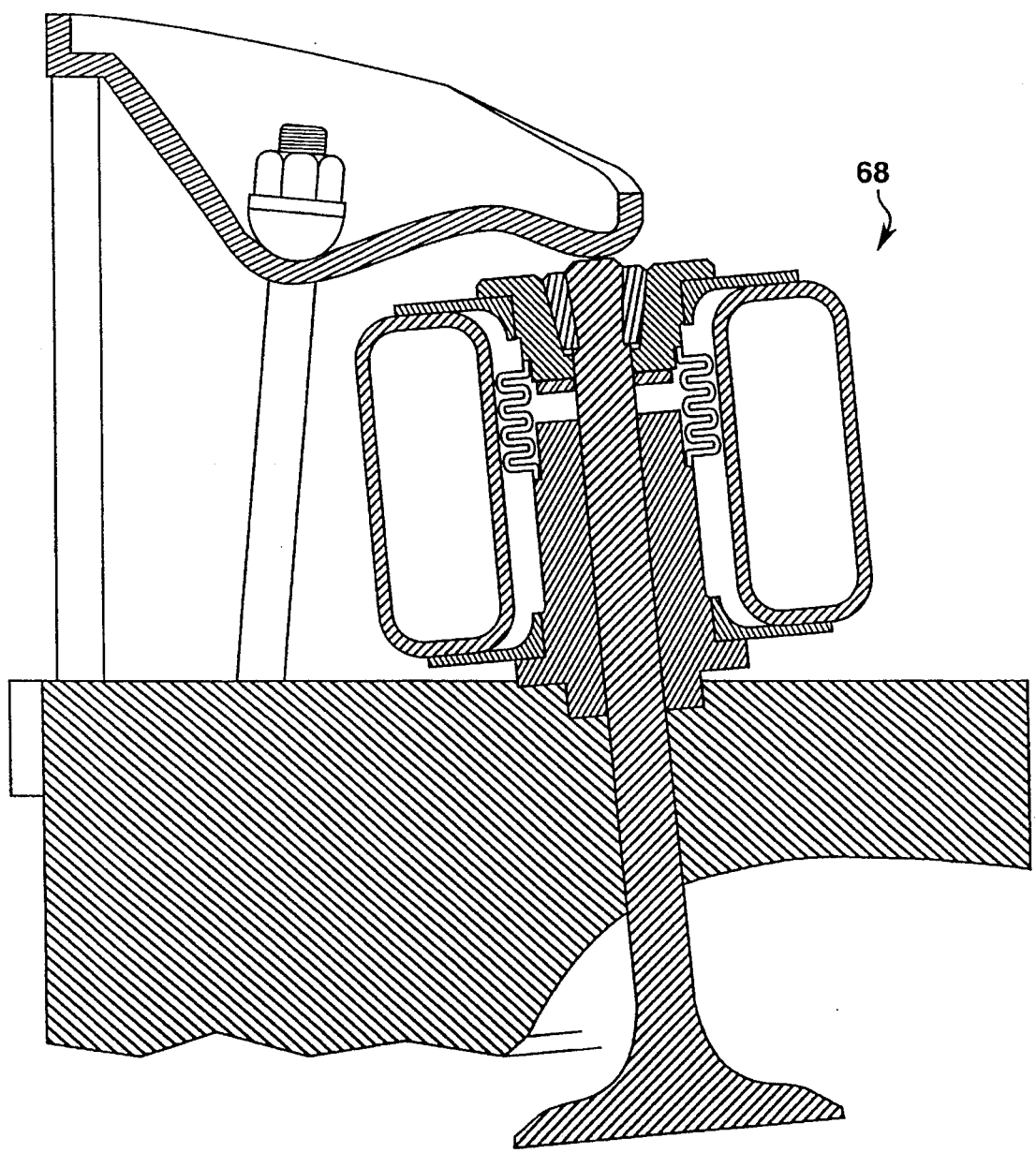
FIG. 2 shows a cross section view of a second embodiment of the present invention.
Figure 3:
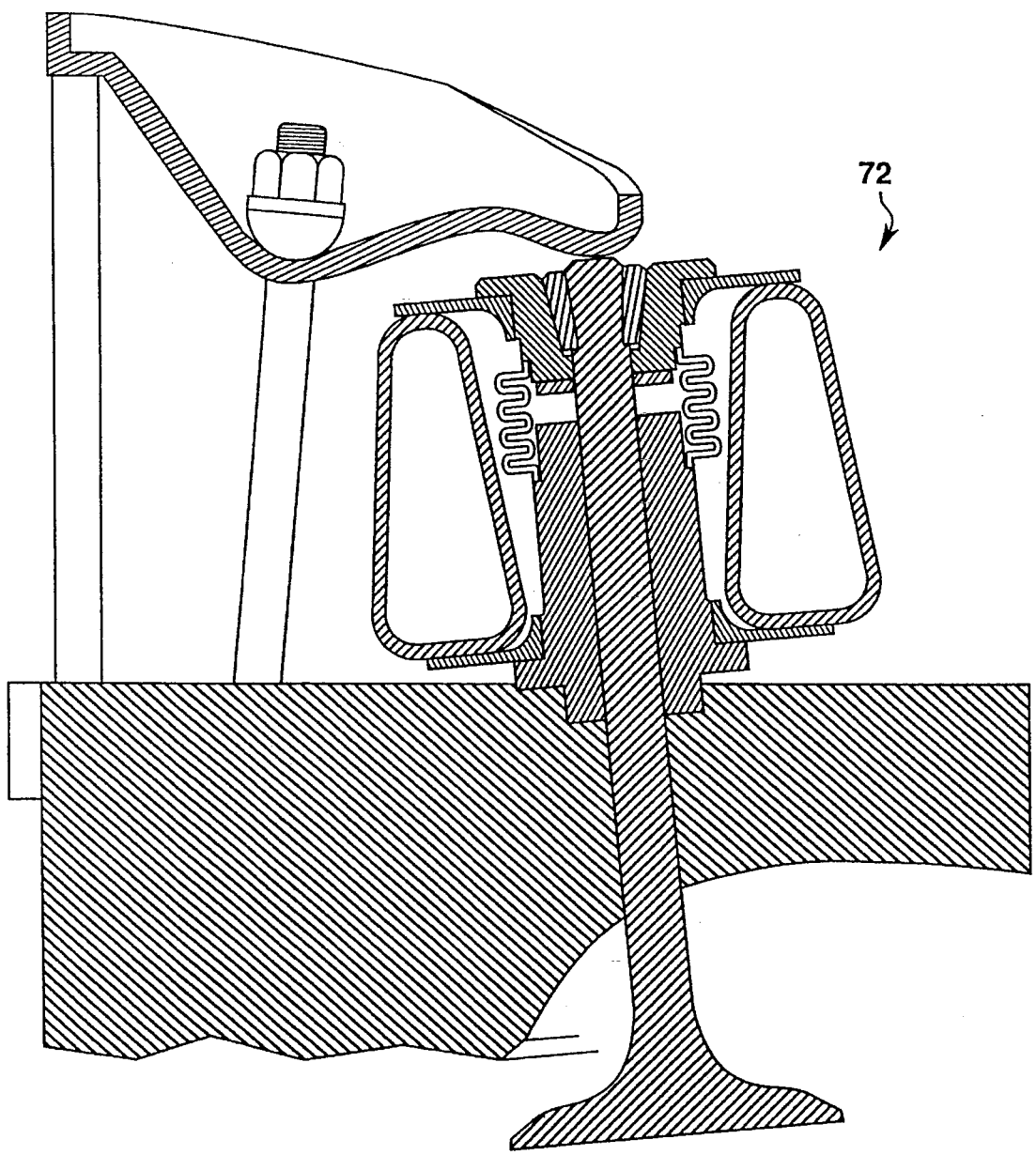
FIG. 3 shows a cross section view of a third embodiment of the present invention.

The air cushions 60 of the present invention may take several forms, as shown in FIGS. 1, 2 and 3, but generally have a resiliently flexible exterior 58 surrounding a hollow interior 59.

In FIG. 1, the air cushion has a series of annular bladders 62, 63 stacked one on top of the other. The annular air bladders 62, 63 are intermediated by a channel 64 which allows gas to flow from one bladder to the other.

Certain advantages are realized by the embodiment shown in FIG. 1 with the two stacked and communicating gas bladders. When one of the gas bladders is subject to compression, the gases therein are locally restrained from proceeding away from the compressive stress. Locally, the gas in one bladder may be temporarily compressed within its own bladder before equalizing the pressure by gas flow through the channel 64 into the other gas bladder. If the compression of the first bladder occurs quickly enough, the local compression of the gas within the bladder may not be communicated to the other gas bladder but predominantly dispelled due to the reactive and restoring tendency of the compressed gas. That is to say, with a short compressive pulse imposed upon one of the gas bladders, the event may take place so quickly that pressure equalization does not have time to occur; and the restoring force of the pneumatic valve spring member arises from the tendency of the compressed gas to expand locally without significant involvement of the other gas bladder.

With respect to the air cushion 68 shown in FIG. 2, the use of a single extended air chamber may present some advantages in certain applications. In FIG. 2, the air cushion 68 is rectangular in cross section and provides a larger gas volume than the air cushion 60 of FIG. 1. The ability to distribute the compression of the air cushion 68 within the interior of the air cushion distributes the pressure better and provides for less stress upon certain areas of the air cushion. More cushioning may occur in the air cushion 68 of FIG. 2 than that of the air cushion 60 in FIG. 1.

As shown in FIG. 3, a third embodiment of air cushions used in the present invention is shown. In FIG. 3, the air cushion 72 is tapered towards the distal end of the valve stem 12 so as to somewhat resemble a cone. As less gas volume is present within the air cushion 72 of FIG. 3, a different restoring response to the compression of the air cushion 72 by the rocker arm 36 may occur. Furthermore, the compressive stress exerted by the upper isolator 52 upon the upper portion of the air cushion 72 may provide a distribution of stress that is advantageous in certain applications.

As contemplated in the present invention, the travel of the air cushions upon compression and their responsiveness thereto is effected by the air-cushion configuration. The air cushion 60 of FIG. 1 is seen as being the most responsive and springy, requiring the least distance of travel while the air cushion 72 of FIG. 3 responds the least and requires greater compressive displacement to effect the same restoring force. Such factors become a concern with respect to large and small engines where larger engines may require less responsiveness of the pneumatic valve spring member of the present invention while high-performance, high-torque engines may advantageously put to use the stacked dual-bladder configuration of the air cushion 60 shown in FIG. 1.

The air cushions of the present invention are contemplated as operating at a constant pressure of approximately 140 psi ($9.6 \, E^5$ Pa). This pressure remains generally constant throughout the compression of the air cushion by the rocker arm 36. By exerting constant, not increasing, pressure, the pneumatic valve spring members of the present invention reduce the load upon the engine, allowing it to produce increased performance without requiring major engine alterations.

The air cushions used in the present invention may be made of resilient plastic or other material able to resiliently maintain its flexibility within the environment present adjacent the engine beneath the valve cover.

Referring now to FIG. 1, initially, the air cushion 60 is inflated to its full volume at a pressure of approximately 140 psi ($9.6 \, E^5$ Pa) internal gas pressure. Air is seen as the preferable gas as it is easily available, but other gases may also be used in the present invention. At full inflation, the air cushion 60 separates the lower 50 and upper 52 isolators to bring the valve retainer 30 and the distal end of the valve stem 12 into close proximity for gentle contact with an adjacent surface of the rocker arm 36. As the push rod 28 raises and engages the distal end of the rocker arm 36, the proximal end of the rocker arm 36 bears upon and depresses the valve stem 12, forcing the valve 14 into the combustion chamber and allowing gases to flow past the valve 14. Upon compression, the upper isolator 52 is brought into closer proximity with the lower isolator 50; and the air cushion 60 is compressed. The pressure of the gas inside the air cushion 60 is temporarily raised and greater force is brought to bear upon the two oppositely opposed isolators 50, 52. This force is insufficient to overcome the force brought to bear upon the distal end of the valve stem 12 by the rocker arm 36 and is first transmitted into a local increase of gas density and gas pressure which is soon transmitted to adjoining gas by pressure flow from areas of higher pressure to lower pressure within the air cushion 60. With the transmission of pressure to the surrounding gas, adjacent pneumatic valve spring members that are holding their valves in a closed position are subject to a temporarily greater pressure, holding such valves closed with a temporarily greater force.

As the rocker arm 36 begins to recede with the lowering of the push rod 28, the pressure maintained within the air cushion 60 serves to restore the valve 14 to its closed and seated position. The distal end of the valve stem 12 follows the course of the rocker arm 36 under the pressure influence of the air cushion 60. Upon the complete retraction of the rocker arm 36, the valve 14 is once again seated against the interior of the combustion chamber, closing the valve and sealing off the combustion chamber.

Preliminary tests were held, indicating that, by reducing the resistance on the engine, the pneumatic valve spring members of the present invention may increase horsepower by as much as 500 percent and may increase the revolutions per minute (rpm) of the engine by as much as 300 percent. In one such preliminary test, a 1965 Ford Mustang with a 289-cubic-inch V8 engine saw an increase of horsepower from 180 horsepower to over approximately 1000 horsepower (1.34 $E^5$ watts to 7.46 $E^5$ watts). While the Mustang with its original valve springs struggled at 4,800 rpm, installation of the present invention allowed the engine to operate well at well over 10,000 rpm. Such dramatic results counsel prudence upon casual recreational use of the present invention.

Figure 4:
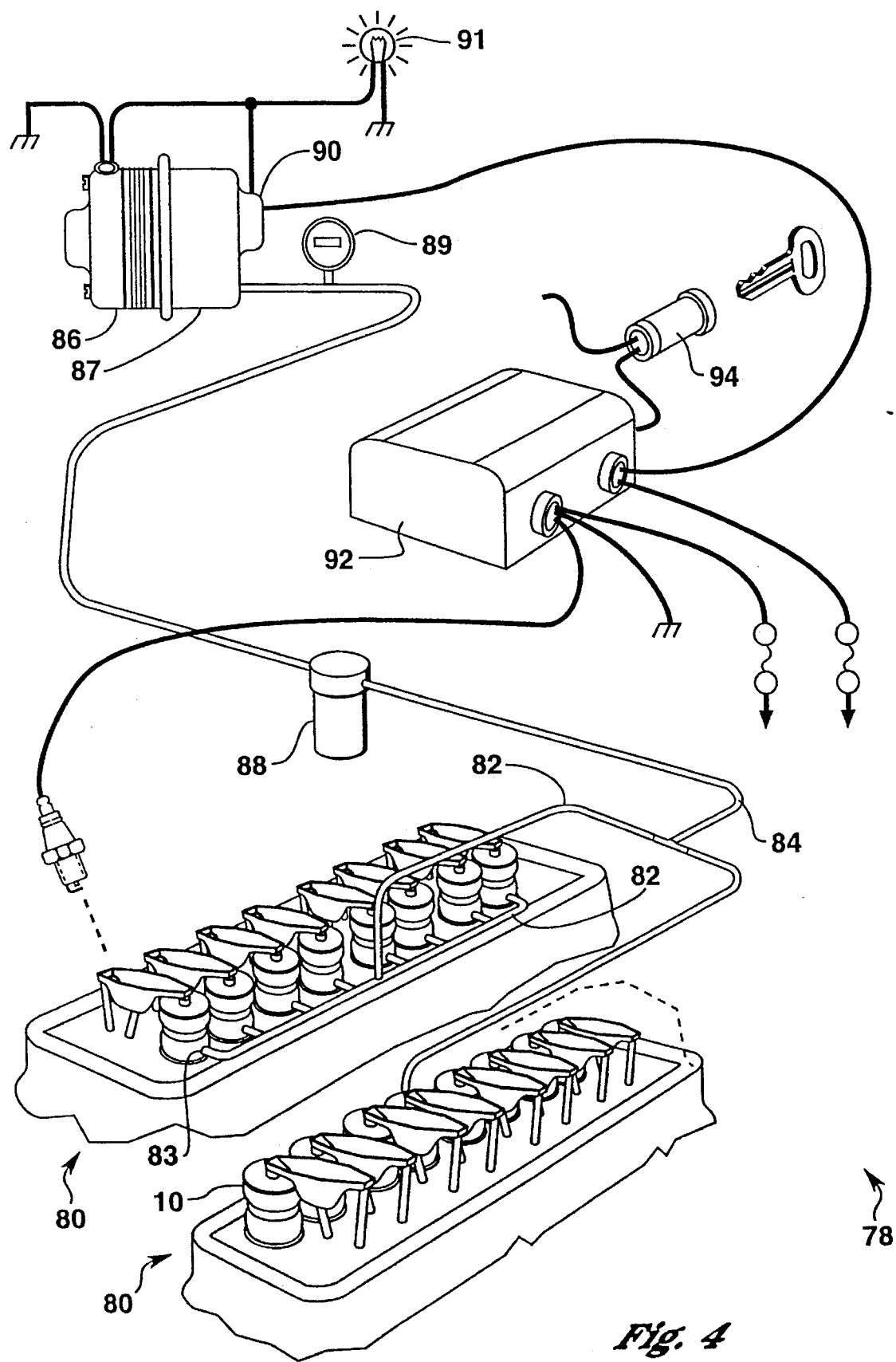
FIG. 4 shows a schematic view of the pneumatic valve assembly system of the present invention including the required air compressor and a controller.

As shown in FIG. 4, the pneumatic valve spring members 10 of the present invention may be fashioned into an assembly 80. Communication between individual pneumatic valve spring members 10 may be effected by pneumatic lines 82, which pass into the air cushion 60 through an aperture 83 formed in the side of the air cushion 60. A main pneumatic line 84 may connect the pneumatic valve spring assembly 80 with an air compressor 86 and reservoir 87. In order to prevent water from collecting inside the pneumatic lines 82, 84 and the individual pneumatic valve spring members 10, a water trap 88 may be placed in line between first, the air compressor 86 and the reservoir 87 and second, the pneumatic valve spring assembly 80. Furthermore, an in-line pressure indicator 89 can detect and indicate the pressure presently held by the pneumatic valve spring assembly system 78.

A pressure-sensor switch 90 coupled to the air compressor and reservoir 86 may also detect and signal pressure maintained within the pneumatic valve spring assembly system 78. The pressure switch 90 may be part of a feedback system where a preset pneumatic pressure is maintained by switching on the air compressor 86 when low pressure is detected by the pressure switch 90. Likewise, when sufficient pressure is detected by the pressure switch, the air compressor may be shut off until the pressure within the pneumatic valve spring assembly system 78 falls below a predetermined level.

A signal from the pressure switch 90 may be transmitted to an indicator 91 visible to the driver of a vehicle with the present invention installed. Also, the signal from the pressure switch 90 may be transmitted to a controller 92 that may control engine operation according to the signal from the pressure switch 90.

When the engine is first started, an initial period of time is required in order to pressurize the system 78. The controller may detect the turning of a key or the like in an ignition switch 94. When ignition-switch activity is detected, the controller may use battery power or the like to power the air compressor 86 until the system 78 is brought up to pressure. At that point, an indicator may transmit the presence of adequate pressure in the system 78 to the operator, indicating that the ignition sequence may be completed. Prior to that time, the controller 92 may prevent engine ignition. Moreover, the controller 92 may detect a catastrophic loss of pressure in system 78 and shut off the engine in response thereto so that severe damage is not inflicted upon the engine when the engine valves 14 descending into the combustion chamber simultaneously.

By monitoring the engine's speed (rpms), the controller 92 may also limit or govern peak engine rpms. Should engine rpms exceed a pre-set limit (such as 7000 rpms), ignition spark may be withheld from the spark plugs to reduce engine rpms. Once the engine speed has fallen below the pre-set limit, engine spark may be returned to the spark plugs, maintaining the running of the engine.

In order to provide the controller 92 with sufficient power and the like, the controller 92 may be connected to the #1 spark plug to detect engine rpm's, the ground, a switched source of 12-volt DC power, and a direct source of 12-volt DC power.

While the present invention has been described with regards to particular embodiments, it is recognized that additional variations of the present invention may be devised without departing from the inventive concept.

INDUSTRIAL APPLICABILITY

The present invention may be applied industrially to internal-combustion engines thereby enhancing performance and increasing power output.

What is claimed is:

1. A pneumatic valve spring member (10) for an internal-combustion engine, comprising:

a valve guide (16), said valve guide defining a valve stem passage (24) through which a valve stem (12) may reciprocatingly travel in a manner guided by said valve guide;

a valve retainer (30), said valve retainer coupled to a distal end of said valve stem, said valve retainer reciprocatingly travelling with said valve stem;

a bellows seal (42), said bellows seal sealingly attached at a first end to said valve guide and at a second end to said valve retainer, said bellows seal preventing the further travel of blow-by gasses from said valve stem passage and allowing resiliently flexible articulation between said valve guide and said valve retainer;

a lower isolator (50), said lower isolator extending laterally about said valve guide;

an upper isolator (52), said upper isolator extending laterally about said valve retainer; and a pressurized air cushion (60) having a hollow interior (59) and a resiliently flexible exterior (58), said pressurized air cushion held between said lower isolator and said upper isolator, said pressurized air cushion resiliently biasing said valve retainer (30) away from said valve guide (16); whereby an engine valve (14) coupled to said valve retainer (30) is biased closed by the pneumatic valve spring member (10).

2. The pneumatic valve spring member (10) for an internal-combustion engine as set forth claim 1, wherein said upper and lower isolators (52, 50) are made of insulating material.

3. The pneumatic valve spring member (10) for an internal-combustion engine as set forth claim 2, wherein said insulating material is ceramic.

4. The pneumatic valve spring member (10) for an internal-combustion engine as set forth claim 1, wherein said pressurized air cushion defines:

a first annular air chamber (62);

a second annular air chamber (63); and an annular channel (64) allowing communication between said first annular air chamber and said second annular air chamber.

5. The pneumatic valve spring member (10) for an internal-combustion engine as set forth claim 1, wherein said pressurized air cushion defines a single annular air chamber generally rectangular in cross-section (68).

6. The pneumatic valve spring member (10) for an internal-combustion engine as set forth claim 1, wherein said pressurized air cushion defines a single annular air chamber generally conical in cross-section (72).

7. The pneumatic valve spring member (10) for an internal-combustion engine as set forth in claim 1, wherein said resiliently flexible exterior (58) of said pressurized air cushion (60) defines at least one air flow aperture (83) communicating with said hollow interior (59) of said pressurized air cushion and allowing air flow therethrough to and from said hollow interior.

8. A pneumatic valve spring member (10) for an internal-combustion engine, comprising:

a valve guide (16), said valve guide defining a valve stem passage (24) through which a valve stem (12) may reciprocatingly travel in a manner guided by said valve guide;

a valve retainer (30), said valve retainer coupled to a distal end of said valve stem, said valve retainer reciprocatingly travelling with said valve stem;

a bellows seal (42), said bellows seal sealingly attached at a first end to said valve guide and at a second end to said valve retainer, said bellows seal preventing the further travel of blow-by gasses from said valve stem passage and allowing resiliently flexible articulation between said valve guide and said valve retainer;

a lower ceramic isolator (50), said lower isolator extending laterally about said valve guide;

an upper ceramic isolator (52), said upper isolator extending laterally about said valve retainer; and a pressurized air cushion (60) having a hollow interior (59) and a resiliently flexible exterior (58), said pressurized air cushion defining first and second annular air chambers (62, 63) and an annular channel (64) allowing communication between said first annular air chamber and said second annular air chamber, said pressurized air cushion held between said lower isolator and said upper isolator, said pressurized air cushion resiliently biasing said valve retainer away from said valve guide; whereby an engine valve (14) coupled to said valve retainer (30) is biased closed by the pneumatic valve spring member (10).

\* \* \* \* \*